UNITED STATES PATENT OFFICE.

MATHIAS HENNEN, OF MINNEAPOLIS, MINNESOTA.

WEATHERPROOF PASTE.

No. 823,330.

Specification of Letters Patent.

Patented June 12, 1906.

Application filed February 6, 1906. Serial No. 299,824.

*To all whom it may concern:*

Be it known that I, MATHIAS HENNEN, of Minneapolis, Hennepin county, Minnesota, have invented certain new and useful Improvements in Weatherproof Paste, of which the following is a specification.

In the erection of a building it is customary to use some kind of paste filling material around the windows between the building-wall and the staff-bead to prevent the cold air and dust from entering the building around the window-frame. The material ordinarily employed as a filling for this crack or crevice has been found to be unsatisfactory, as it will shrink away from the building-wall and from the bead, thereby opening the joint, and will frequently crack and fall out of the joint altogether. Various substances have been employed in an attempt to remedy this defect; but all of them, as far as I know, have been for one cause or another unsuitable and unsatisfactory. Most of the materials employed will shrink and crack when exposed to the weather, as above described, and none of them will remain intact in all temperatures and form a perfect seal between the bead and the wall.

The object therefore of my invention is to provide a plastic substance which when filled into the joint between the staff-bead and wall of a building will adhere to the surfaces on each side and upon becoming hard will not crack or shrink away from the wall and the bead and expose the joint to the entrance of cold air or dust and dirt.

A further object is to provide a plastic substance which will be absolutely weather-proof and having once become set in the joint will remain so permanently regardless of the varying degrees of temperature to which it may be exposed.

My invention consists generally in the composition of ingredients, as described, and pointed out in the claims.

In carrying out my invention I have found that to produce the best results the following materials should be used in the proportions named: putty, five pounds; pumice-stone, one-fourth pound; varnish, two ounces; raw linseed-oil, two ounces; butter of antimony, one ounce; japan, two ounces; turpentine, one ounce; acetic acid, one ounce. These ingredients are all mixed and kneaded together into a plastic mass, and when the materials have been thoroughly mixed an oily creamy substance will collect on the surface, which will adhere to the walls of the joint and render it impervious to the passage of moisture, dust, or air. The material when placed in the joint and exposed to the weather will harden slowly, but on becoming thoroughly set will be almost as firm and rigid as the surfaces to which it adheres. Any suitable coloring-matter may be used in the paste, according to the color of the building-wall where it is used.

The paste in addition to its use in connection with the joints around a window-frame may be employed in the setting of skylights, sidewalk-blocks, or tiling, or wherever it is necessary or desirable to employ a plastic substance which will not shrink or crack when exposed to the weather and will be air and moisture proof.

The proportions of ingredients herein specified may of course be varied without departing from the spirit of my invention, and equivalent substances may be employed for some of the ingredients used.

I claim as my invention—

1. The herein-described weatherproof composition consisting of putty, pumice-stone, varnish, raw linseed-oil, butter of antimony, japan, turpentine, and acetic acid.

2. The herein-described weatherproof composition comprising putty, powdered stone, varnish, oil, butter of antimony, turpentine, acetic acid, and a drier.

3. The herein-described weatherproof composition consisting of putty five pounds, pumice-stone one-fourth pound, varnish two ounces, raw linseed-oil two ounces, butter of antimony one ounce, japan two ounces, turpentine one ounce, and acetic acid one ounce.

In witness whereof I have hereunto set my hand this 31st day of January, 1906.

MATHIAS HENNEN

Witnesses:
RICHARD PAUL,
C. MACNAMARA.